April 27, 1943.   C. G. PREIS   2,317,403
METHOD OF MANUFACTURING TIN PLATE
Filed March 7, 1941   2 Sheets-Sheet 1

INVENTOR.
Carl G. Preis
BY Ivan D. Thornburgh
Chas. H. Erne
ATTORNEYS

April 27, 1943.  C. G. PREIS  2,317,403
METHOD OF MANUFACTURING TIN PLATE
Filed March 7, 1941  2 Sheets-Sheet 2

INVENTOR.
Carl G. Preis
BY Ivan D. Thornburgh
Chas. H. Erne
ATTORNEYS

Patented Apr. 27, 1943

2,317,403

UNITED STATES PATENT OFFICE 2,317,403

METHOD OF MANUFACTURING TIN PLATE

Carl G. Preis, New York, N. Y., assignor to American Can Company, New York, N. Y., a corporation of New Jersey Application March 7, 1941, Serial No. 382,242

2 Claims. (Cl. 117—114)

The present invention relates to preparing scroll edge ferrous black plate sheets for can manufacture and has particular reference to method steps for the production of tin plated sheets which can be used for circular or other non-rectangular can parts or other articles with a minimum of waste. This invention is a continuation in part of as well as an improvement over the invention disclosed and claimed in my copending application Serial Number 184,689, filed in the United States Patent Office January 12, 1938, and issued March 11, 1941 as Patent No. 2,234,195.

In large scale production of tin can parts in a can manufacturing plant where millions of such parts are produced by punching, blanking and forming from tin coated sheets, any areas of the sheet which are not cut out at that time or later, represent waste and become scrap which has a very small re-sale value. Obviously even small portions of waste in a single sheet when multiplied by the millions of sheets used by a single large can manufacturer, for example, become a serious loss and many attempts have been made to minimize such waste. A considerable length of time often passes between the time that a tin plated sheet is prepared at the tin mill until it is cut in the can manufacturer's plant. During this time the tin plated sheets must be stored in stacks in the warehouses of the can manufacturer and some provision must be made to prevent rust. Obviously, all of the edges of the sheet as well as its flat surfaces must be fully protected and the tin coating on the plate provides such protection.

In the present invention it is contemplated to save waste at the tin mill by first removing waste areas from the sheet which will not be of value to the can manufacturer in subsequent cutting and by the removal of such waste stock at the time and place where it has value, that is, where it can be put back into the melting pot and where added expense such as scrap handling and transportation charges can be entirely avoided.

According to the practice of the present invention the uncoated ferrous black plate may be cut at the tin mill so that opposite edges are of a scroll configuration in accordance with the purposes for which the sheet will be subsequently used. Just how this scrolling action will be accomplished is not of importance in the present invention there being many well known ways of cutting material so that opposite edges will have the scroll shape.

The sheet with its scroll edges is then properly pickled and tinned in a manner that will insure complete protection of all portions of the scroll edged cut sheet and will provide for the greatest efficiency in article cutting at the can manufacturing plant. Even if the article or can part cutting is not done until considerable time has elapsed, the sheet configuration is such as to insure such maximum efficiency in the division of the sheet into its ultimate parts.

An object of the present invention is the provision of a method of treating ferrous sheets of black plate having oppositely disposed scroll edges in a manner that will provide tinned sheets having the greatest usable cutting areas for the subsequent production of circular or other non-rectangular articles, such sheets having their scroll edges as well as all other edges and surfaces protected against rust by the tin coating.

Another object of the invention is the provision of such a method of treating scroll edged sheets wherein the sheet while being tinned as in a molten tinning bath will not have the opposed scroll edges included as a drip edge for the sheet to the end that greater article cutting efficiency may be had.

Numerous other objects and advantages of the invention will be apparent as it is better understood from the following description, which, taken in connection with the accompanying drawings, discloses a preferred embodiment thereof.

Referring to the drawings.

Figure 2:
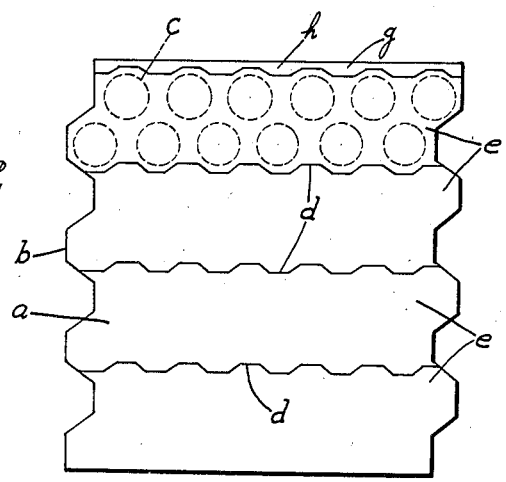
Fig. 2 is a schematic plan layout of certain cutting procedure on the tin plate sheet when used in the manufacture of circular articles.

In order to fully explain the efficiency of cutting of non-rectangular work as by a can manufacturer, attention is directed to Fig. 2 which discloses, schematically, a technical layout for cutting circular articles from a sheet having the opposed scroll edges previously referred to. This view furthermore suggests a common practice in can manufacturing procedure of first dividing a sheet into scroll strip form suitable for automatic feeding into can manufacturing presses or other machines, including cutting, blanking or forming die mechanism at which time the maximum effective cutting area is removed from the strip to provide the desired articles.

For the purpose of exemplifying the steps of the present invention the letter a designates a sheet having opposed scroll edges b. A circular article to be cut is designated by the letter c although any shape not rectangular will indicate a type of layout more or less similar to that disclosed in this figure. The available cutting areas defined by the circles or discs may be arranged in two or more rows in staggered relation according to well known practices in the can making art.

When an individual sheet a is received at the can manufacturer's plant if cutting is to be done in automatic strip feed presses the sheet may be divided longitudinally by other scroll lines or cuts d, producing what is known in the art as a scroll strip c. Each of the scroll strips illustrated in this figure contains two rows of cutting areas and this form is used in making can parts in a double die cutting press. In many cases more than two rows are used and the proper number of gang dies may then be utilized. Obviously a single row of cutting areas in each strip would be cut in a single die automatic strip feed press.

Figure 1:
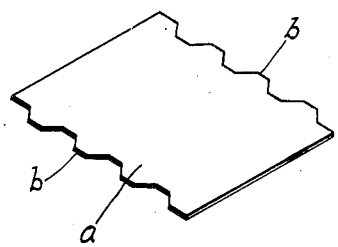
Figure 1 is a perspective view of a ferrous sheet of black plate having oppositely disposed scroll edges.

The first step in the present procedure of treating a scroll edge sheet a (Fig. 1) is to subject it to a pickling process. This operation is well known and usually comprises a number of acid baths in which the sheets are dipped. The holders with the sheets being treated are raised and lowered several times in each bath to obtain proper pickling action for all surfaces. The first bath into which the sheets are immersed is usually the full strength acid bath and the subsequent baths to be used contain weaker acid solutions. The final operation of pickling comprises placing the sheets into a washing tank for removal of the acid. The sheets are thereafter kept under water until ready for the tinning operation.

Figure 3:
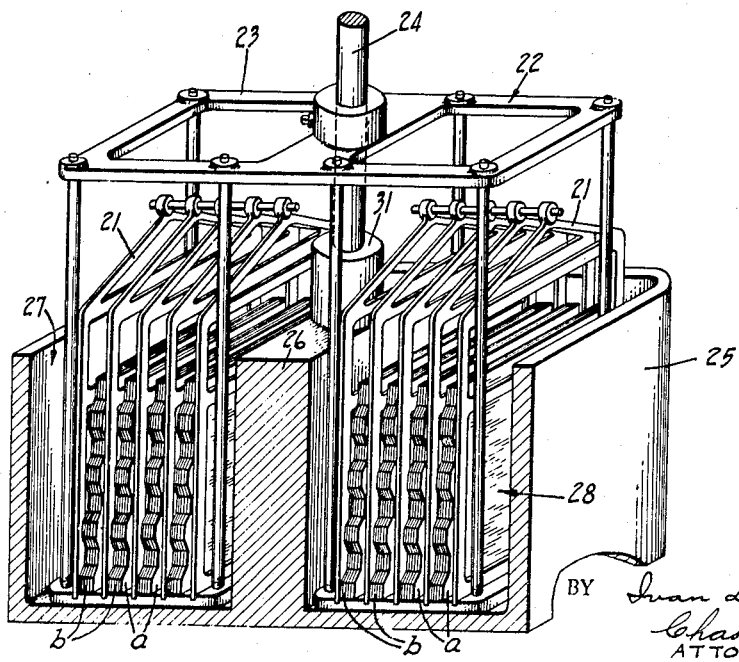
Fig. 3 is a schematic perspective view showing the pickling operation on a batch of scroll edge sheets in accordance with the invention.

In the drawings such a pickling and washing operation is suggested by the mechanism indicated in Fig. 3, this being in the nature of a schematic showing. For such operations the sheets a are stacked on edge with the scroll edges b at the sides. A number of sheets are stacked in each compartment of a cradle 21, the cradles being carried on a frame 22. Such a frame comprises suitable rods for supporting the cradles and for connecting the same with an upper spider 23. Such a spider may be secured to a vertically disposed shaft 24. The drawings illustrate two different cradles 21 connected by suitable bars to the spider 23 and these cradles are raised and lowered by the raising and lowering of the shaft 24. Both of the cradles are filled with sheets in stacked form, the sheets being loaded into or removed from the cradles by hand or in any other suitable manner.

The cradles 21 are associated with a tank structure 25 which in actual commercial practice may be much larger. The tank is here shown as being provided with a central web wall 26. This wall together with the other walls of the tank enclose an acid bath 27 and a water bath 28. In operation the sheets are filled for example into one of the cradles 21. The cradles are then lowered and the sheets in the cradle are immersed into the pickling bath 27 and receive a pickling operation.

After this is completed the frame 22 is raised by lifting of the shaft 24 and the cradle 21 containing the sheets which have just been subjected to the pickling solution in the tank 28 are swung around into position above the washing bath 28. The other cradle 21 is then loaded for sheets next to be pickled. At the next lowering of the frame, therefore, the pickled sheets are suitably washed in the water bath 28 and the new sheets are subjected to the pickling bath 27. After once starting the operation the pickling and washing operations can be continued as washed sheets are removed each time and new sheets loaded into the cradle.

The shaft 24 has a sliding connection in a boss 31 formed on the top part of the wall 26. This construction permits easy raising and lowering of the frame 22 with its load of sheets any desired number of times to effect the proper pickling and washing operations. It also permits easy changing of the sheets from bath to bath by rotation of the frame with the shaft 24. In this manner the scroll sheets are properly pickled and are then ready for tinning.

Figure 4:
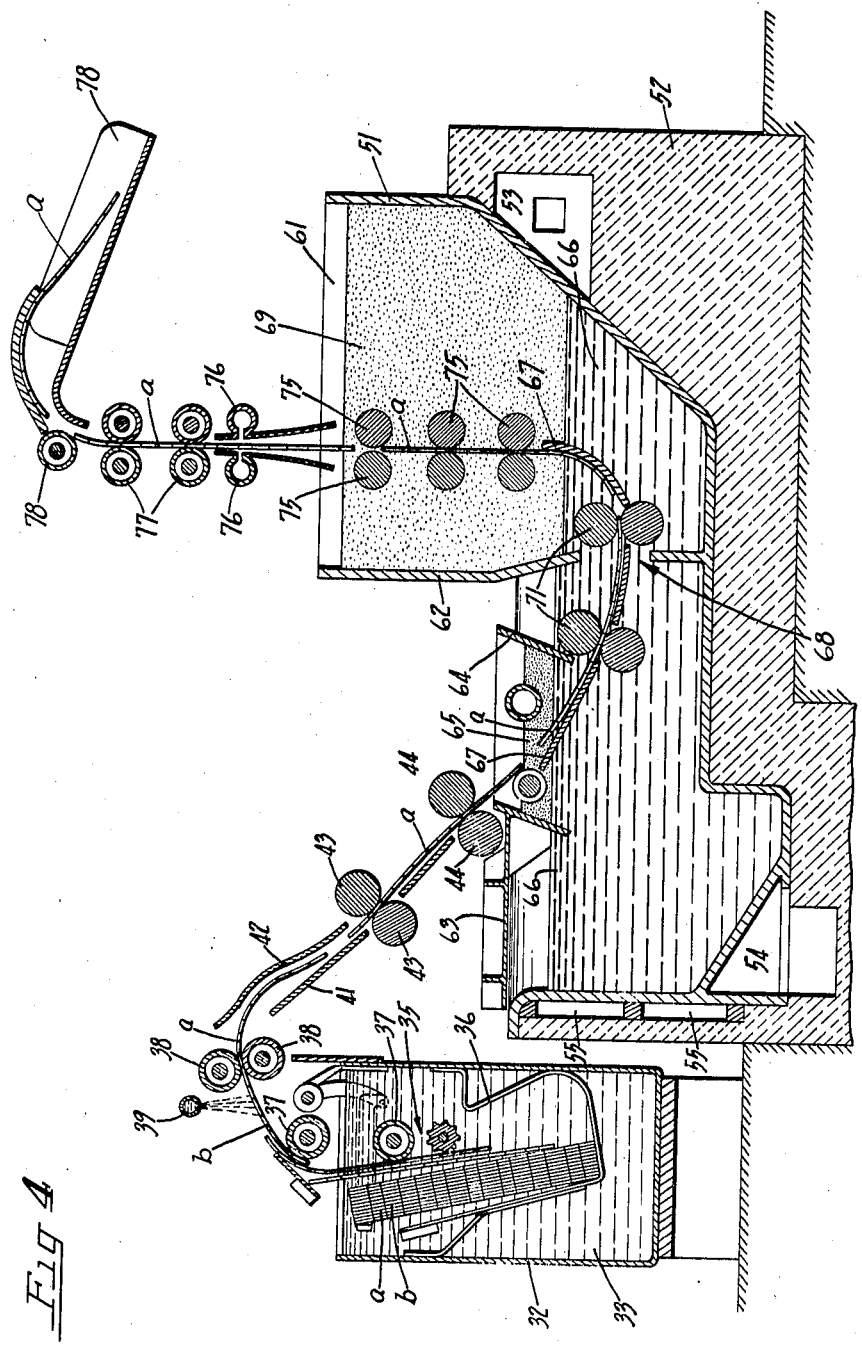
Fig. 4 is a schematic view in longitudinal vertical section of mechanism for carrying out the tinning operation on the sheets.

The washed sheets may be transferred by hand or in any suitable manner into a feeding tank 32 (Fig. 4) which contains water 33. This is a part of the tinning mechanism. An automatic feeding mechanism generally referred to by the numeral 35 operates in the tank 32 and feeds a single sheet from the stack of sheets in the water bath 33. The stack of sheets for this feeding operation are supported on a suitable holder 36 connected with the sides of the tank 32 so that the stack of sheets are in proper position for feeding. In this stacked position within the holder the scroll edges of the sheets are at the sides of the stack.

As the feeding device 35 separates a single sheet from the stack within the tank 32 it passes the sheet over rollers 37. The first of such rollers is located under the water 33 of the tank and the second roller is above the tank. The sheet is moved up and over the upper roller 37 and as it bends over and toward the right (as in Fig. 4) the sheet enters into a pair of feed rollers 38. During this passage into the feed rollers the sheet may be subjected to a spray of water from a supply pipe 39.

Upon passing through the rollers 38 the sheet a is further guided between a support plate 41 and a spaced top guide plate 42 and enters into a pair of feed rollers 43 and thence into rollers 44. The latter conveys the sheet directly into the tinning bath.

The tinning bath is contained within an oblong tank 51 which is supported on a foundation 52 of masonry or other suitable heat insulating material. The tank may be maintained at a proper temperature for keeping molten tin in liquid form. For this purpose a suitable heating medium such as steam or hot air may be circulated through the foundation 52 as by means of ducts 53, 54 and 55. Such ducts are arranged so that the heating medium comes into contact with the bottom and end walls of the tank 51 at suitable places.

The tank 51 is provided with a raised hopper section 61, such a hopper having a central wall 62 extending down to the bottom of the tank just to one side of the middle. A cover frame section 63 is carried by the tank and this section is formed to provide an entrance hopper 64 for the sheet as it is fed from the rollers 44 arranged thereabove.

The hopper section 64 is adapted to contain a suitable fluxing material 65 which may be heated by a heating medium circulated through a pipe or other similar device. The material 65 floats on top of the molten tin contained within the tank 51. This liquid tin is indicated by the numeral 66. The sheet $a$ is passed through this fluxing liquid and is guided by a curved plate 67 down into the molten tin. Such a curved plate extends through an opening 68 formed in the wall 62 of the hopper section 61, this being beneath the molten tin.

Curved plate 67 also extends up on the other side of the wall 62 and protrudes into the hopper section 61. This hopper section of the tank contains palm oil 69 which floats on the molten tin. During this passage of the sheet $a$ through the opening 68, two pairs of guide rollers 71 maintain the proper path of travel for the sheets.

The sheet $a$ upon leaving the feed rollers 71 pass through a series of rollers 75 located in the palm oil 69 and this elevates the sheet while maintaining it in a vertical position. The sheets passing through the upper pair of rollers 75 then advance through suitable hot air drying elements 76. Above these elements the sheet is engaged by feed rollers 77. These latter rollers carry the sheet up and a roller 78 bends it over into a discharge chute 79. From here it may be conveyed to any suitable place of deposit.

The mechanism just described as being associated with the tinning operation is of standard or conventional design. Sheets $a$ are passed continuously without interruption from the water holding tank 33 through the fluxing liquid 65, the molten tin 66 and the palm oil 69, finally discharging as a fully tinnned scroll edged sheet.

From the foregoing description it will be evident that during all of the tinning operation the scroll edges of the sheet are at the sides. The drip edge, therefore, of the sheet as it emerges from the tin bath will be at the bottom, which is a straight side of the sheet $a$.

By this arrangement the drip edge is not included in either of the scroll side edges of the sheet. Accumulation of tin on the drip edge therefore is located along the straight rear edge of the sheet where it will not interfere with the cutting of the strips from the sheets as already explained in reference to Fig. 2. Such a drip edge is designated in this figure by the letter $g$ and any accumulation of tin along this edge falls into a scrap strip $h$ produced by cutting of the longitudinal scroll lines in forming the end strip $e$.

It will be understood that in the event that scroll sheets $a$ of black plate are to be electroplated instead of immersed in molten tin a slightly different procedure will be necessary. In the case of electroplating the sheets will be passed through the electrolite in the usual manner during which time the tin is electrically deposited upon the sheet.

Irrespective of the manner of tinning the sheet the scroll edges as well as other edges and surfaces of the sheet are fully tinned and the entire sheet is thus protected against rust. The sheet $a$ is then in condition to be sent from the tinning mill to the can manufacturer or elsewhere for the cutting of the circular or other nonrectangular articles contemplated in the scroll design of the sheet. Since the sheet is fully protected it does not make any difference when such cutting may take place.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. A method of preparing tin plate stock for the subsequent cutting of non-rectangular articles therefrom with a minimum of waste material, comprising immersing and continuously passing ferrous stock in individual sheet form having oppositely disposed scroll cut edges through a molten tin bath with the scroll cut edges disposed laterally of the sheets in respect to their direction of travel through said bath, said scroll cut sheets each having a total area corresponding closely to the total area of the tin coated non-rectangular articles to be produced therefrom, the described manner of tinning the sheets minimizing the presence of a drip edge in the scroll cut area and conditioning the individual tinned sheets for the subsequent production of said non-rectangular tin coated articles with a minimum of waste material.

2. A method of preparing tin plate stock for the subsequent cutting of circular articles therefrom with a minimum of waste material, comprising subjecting individual sheets of ferrous black plate having oppositely disposed scroll cut edges to a pickling operation to condition the scroll cut sheets for tinning, immersing and continuously passing said pickled sheets through a molten tin bath with the scroll cut edges disposed laterally of the sheets in respect to their direction of travel through said bath, the rear edges of said sheets being substantially straight, said scroll cut sheets each having a total area corresponding closely to the total area of the tin coated circular articles to be produced therefrom, the described manner of tinning the sheets minimizing the presence of a drip edge in the scroll cut side edge area and conditioning the individual tinned sheets for the subsequent production of said circular tin coated articles with a minimum of waste material.

CARL G. PREIS.